United States Patent
Goswami et al.

(10) Patent No.: US 11,763,159 B2
(45) Date of Patent: Sep. 19, 2023

(54) MITIGATING FALSE RECOGNITION OF ALTERED INPUTS IN CONVOLUTIONAL NEURAL NETWORKS

(71) Applicants: International Business Machines Corporation, Armonk, NY (US); Indraprastha Institute of Information Technology (IIIT), Delhi, New Delhi (IN)

(72) Inventors: Gaurav Goswami, Karnataka (IN); Sharathchandra Pankanti, Fairfield County, CT (US); Nalini K. Ratha, Yorktown Heights, NY (US); Richa Singh, New Delhi (IN); Mayank Vatsa, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1415 days.

(21) Appl. No.: 15/882,087

(22) Filed: Jan. 29, 2018

(65) Prior Publication Data
US 2019/0236402 A1 Aug. 1, 2019

(51) Int. Cl.
*G06N 3/08* (2023.01)
*G06N 3/084* (2023.01)
(Continued)

(52) U.S. Cl.
CPC ......... *G06N 3/084* (2013.01); *G06F 18/2413* (2023.01); *G06N 3/08* (2013.01);
(Continued)

(58) Field of Classification Search
CPC ...... G06N 20/00; G06N 3/0454; G06N 3/084; G06N 5/04; G06N 3/04; G06N 3/0445;
(Continued)

(56) References Cited

U.S. PATENT DOCUMENTS

| 2014/0247963 A1* | 9/2014 | Lin ..................... G06V 30/248 382/103 |
| 2015/0193630 A1* | 7/2015 | Von Kaenel ........... G06Q 40/08 707/785 |

(Continued)

FOREIGN PATENT DOCUMENTS

CN 106599883 A 4/2017

OTHER PUBLICATIONS

Gao et al. DeepCloak: Masking Deep Neural Network Models for Robustness Against Adversarial Samples (Apr. 17, 2017) (Year: 2017).*

(Continued)

*Primary Examiner* — Luis A Sitiriche
(74) *Attorney, Agent, or Firm* — Garg Law Firm, PLLC; Rakesh Garg; Peter Edwards

(57) ABSTRACT

A neural network is configured to suppress an output of a mitigation node in a mitigation layer of the neural network. The neural network is pre-configured to recognize objects from inputs when operating using a processor and a memory. An actual input is sent to the neural network for object recognition, the actual input is an altered input. By suppressing the output of the mitigation node, the neural network is caused to avoid falsely recognizing an object from the actual input, where the altered input is configured to cause the neural network to falsely recognize the object from the actual input.

18 Claims, 7 Drawing Sheets

(51) Int. Cl.
*G10L 17/02* (2013.01)
*G06N 20/00* (2019.01)
*G06V 10/44* (2022.01)
*G06V 40/16* (2022.01)
*G06V 40/30* (2022.01)
*G06F 18/2413* (2023.01)
*G06V 10/82* (2022.01)
*G06F 18/241* (2023.01)

(52) U.S. Cl.
CPC ........... *G06N 20/00* (2019.01); *G06V 10/454* (2022.01); *G06V 10/82* (2022.01); *G06V 40/16* (2022.01); *G06V 40/30* (2022.01); *G10L 17/02* (2013.01); *G06F 18/241* (2023.01)

(58) Field of Classification Search
CPC ........ G06N 3/08; G06N 3/0481; G06N 3/063; G06N 3/082; G06K 9/6256; G06K 9/6262; G06K 9/00288; G06K 9/00899; G06K 9/6267; G06F 21/56
See application file for complete search history.

(56) References Cited

U.S. PATENT DOCUMENTS

| | | | |
|---|---|---|---|
| 2016/0078279 A1 | 3/2016 | Pitre et al. | |
| 2017/0103194 A1 | 4/2017 | Wechsler | |
| 2018/0150783 A1* | 5/2018 | Xu | G06Q 10/0633 |
| 2019/0138860 A1* | 5/2019 | Liu | G06K 9/66 |
| 2020/0285939 A1* | 9/2020 | Baker | G06N 3/084 |

OTHER PUBLICATIONS

Dertat, Arden "Applied Deep Learning—Part 4: Convolutional Neural Networks" (Nov. 8, 2017) (Year: 2017).*
Pham, V. et al "Dropout improves Recurrent Neural Networks for Handwriting Recognition" (Mar. 10, 2014) (Year: 2014).*
Wei Wen, Chunpeng Wu, Yandan Wang, Yiran Chen, and Hai Li. Learning structured sparsity in deep neural networks. In Advances in Neural Information Processing Systems, pp. 2074-2082, 2016 (Year: 2016).*
Goodfellow et al., Explaining and Harnessing Adversarial Examples, Mar. 20, 2015 (Year: 2015) (Year: 2015).*
B. Goodfellow et al., Generative Adversarial Nets, Jun. 10, 2014 (Year: 2014) (Year: 2014).*
Xiao et al. Learning Deep Feature Representations with Domain Guided Dropout for Person Re-identification (Apr. 26, 2016) (Year: 2016).*
"Branch and Bound Strategies for Non-maximal Suppression in Object Detection" Matthew B. Blaschko (Year: 2011).*
Sohn et al., "Unsupervised Domain Adaptation for Face Recognition in Unlabeled Videos," arXiv preprint, arXiv:1708.02191 (2017).
Carrara et al., "Detecting Adversarial Example Attacks to Deep Neural Networks," Proceedings of the 15th International Workshop on Content-Based Multimedia Indexing (CBMI '17), ACM, 2017.
Hong et al., "SSPP-DAN: Deep Domain Adaptation Network for Face Recognition with Single Sample per Person," arXiv.org, arXiv:1702.04069v3, May 31, 2017.

* cited by examiner

MITIGATING FALSE RECOGNITION OF ALTERED INPUTS IN CONVOLUTIONAL NEURAL NETWORKS

TECHNICAL FIELD

The present invention relates generally to a method, system, and computer program product for detecting valid identities from inputs to a neural network. More particularly, the present invention relates to a method, system, and computer program product for mitigating false recognition of altered inputs in convolutional neural networks.

BACKGROUND

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A feedforward neural network is an artificial neural network where connections between the units do not form a cycle.

In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Hereinafter, an "object" refers to a person, physical object, place, situation, or circumstance unless expressly distinguished where used.

Hereinafter, an "input" to a neural network is input data that is usable in establishing an identity of an object. An input to a neural network can take any suitable form, including but not limited to actual (photographic) imagery of a person or another object, representative (outlines, caricatures, animations, avatars) graphical facsimile of persons or other objects, speech of a person or sound unique to an object, handwriting of a person or an impression of an object, style of text or writing peculiar to a person, and any suitable representation of one or more biometric features of a person or uniquely identifiable characteristics of another object.

Specifically, a neural network extracts a set of features from the input at various layers and at various nodes in a layer. A feature is an attribute of the input—whether apparent from the input or derived from the input—that causes a node in a layer of the neural network to respond, i.e., activate and produce an output. Different nodes may respond to different features of the input.

As some non-limiting examples of features extracted from an example image input, a feature may be a line, segment, area, shade, color, intensity, shape, weight, thickness, angle, distance or a change therein; and the feature may be relative to one or more points in the image, pixel value change between two or more pixels, or some combination thereof.

Hereinafter, "object recognition" refers to the process of recognizing an object from a given input. Neural networks, such as a CNN, implement deep learning methodologies for object recognition. Object recognition by a neural network includes feature extraction by the various nodes and layers of the neural network, and producing a final output from the neural network by propagating the activations caused by the detected or extracted features such that the final output is indicative of recognizing (or not recognizing) the object from the input.

Without implying any limitation thereto, the various embodiments herein are described by applying an input relative to a CNN. Those of ordinary skill in the art will be able to adapt an embodiment to other types of layered neural networks, and such adaptations are contemplated within the scope of the illustrative embodiments.

SUMMARY

The illustrative embodiments provide a method, system, and computer program product. An embodiment includes a method that configures a neural network to suppress an output of a mitigation node in a mitigation layer of the neural network, wherein the neural network is pre-configured to recognize objects from inputs when operating using a processor and a memory. The embodiment sends an actual input to the neural network for object recognition, wherein the actual input is an altered input. The embodiment causes, responsive to suppressing the output of the mitigation node, the neural network to avoid falsely recognizing an object from the actual input, wherein the altered input is configured to cause the neural network to falsely recognize the object from the actual input.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
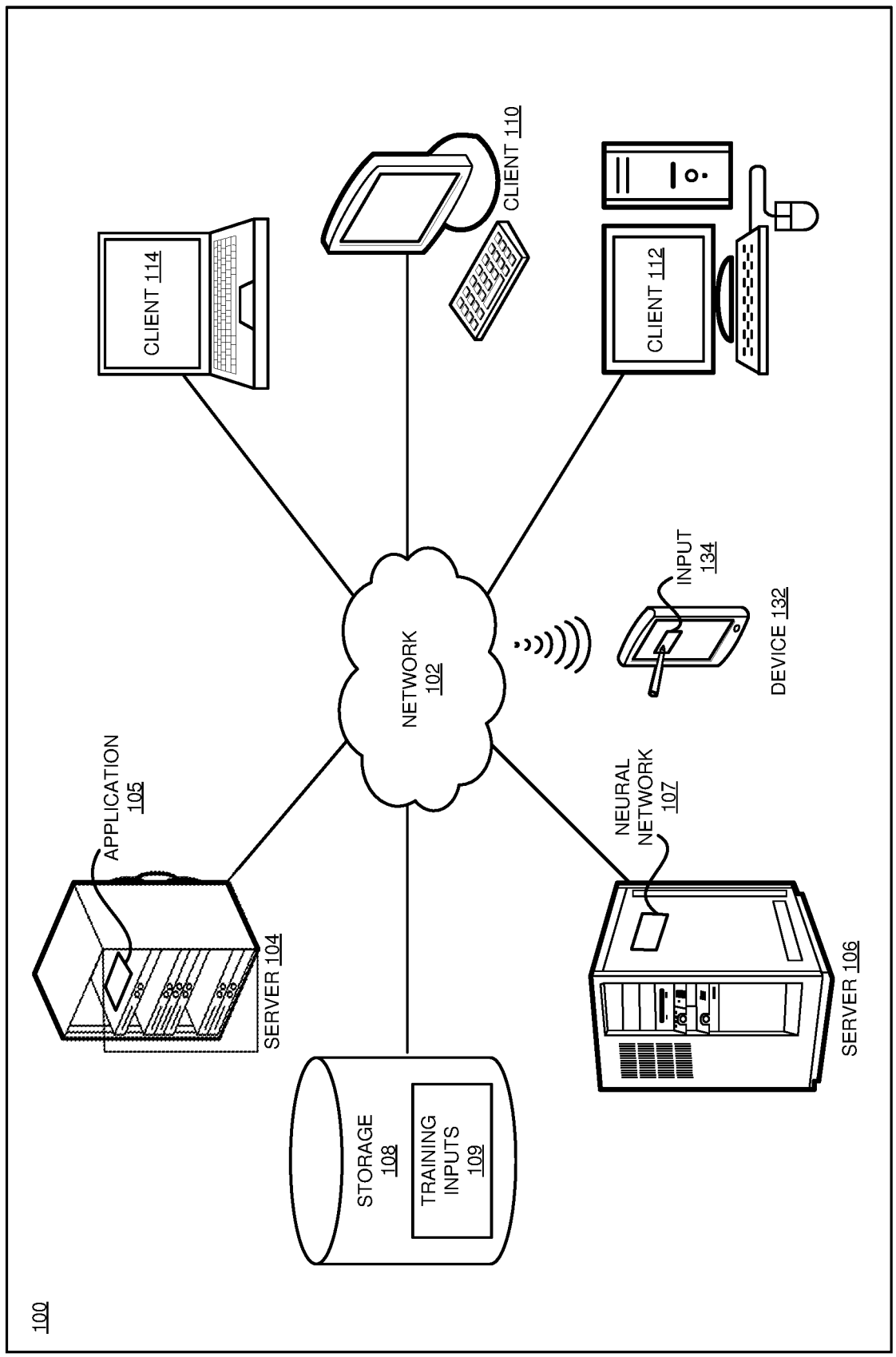
FIG. 1 depicts a block diagram of a network of data processing systems in which illustrative embodiments may be implemented.

The illustrative embodiments recognize that while a neural network can be trained for object recognition, neural networks are also prone to false recognition of objects from altered inputs. An altered input is an input, which has been constructed to cause a false recognition of an object from the altered input. For example, a facial image of one person can be altered—such as by adding noise or masking or by manipulating the facial features—such that the image causes the person to be recognized by a neural network as a different person. As another example, a speech pattern of one person can be altered such that the speech pattern appears to have been spoken by a different person.

Note that a true recognition includes correctly validating a valid input or correctly rejecting an altered input. Conversely, a false recognition includes incorrectly validating an altered input or incorrectly rejecting a valid input. For example, the features extraction from a valid input producing an affirmative recognition as a final output, or the features extraction from an altered input producing a final output that is a negative recognition of the object are considered true recognitions. Similarly, the features extraction from an altered input producing an affirmative recognition as a final output, or the features extraction from a valid input producing a final output that is a negative recognition of the object are considered false recognitions. Just as a node in a layer of a neural network extracts a feature from a valid input, a node of a layer of the same neural network also extracts a feature from an altered input. The illustrative embodiments recognize that the features extracted from altered inputs play an important role in false recognitions.

The illustrative embodiments recognize that just about any type of input contemplated herein can be altered to cause a trained neural network to falsely identify or recognize an object as a different object, or extract features that incorrectly indicate a presence of an object from an input where the object is not actually present, or both. The alterations can be unintentional, e.g., when an input is affected by system-induced noise or deformation, or malicious, when the input is altered to cause the neural network to make a false recognition in an adversarial attack.

The illustrative embodiments recognize that a methodology for mitigating false recognitions by neural networks is essential to making deep learning based neural networks robust against altered inputs yet remaining sufficiently accurate for real-world applications. The illustrative embodiments further recognize that the methodology for mitigating false recognitions should be independent of the specific architecture of the neural network in question, and should be deployable across a variety of neural networks in a consistent manner.

The illustrative embodiments recognize that the presently available tools or solutions do not address these needs/problems or provide adequate solutions for these needs/problems. The illustrative embodiments used to describe the invention generally address and solve the above-described problems and other related problems by mitigating false recognition of altered inputs in convolutional neural networks.

An embodiment can be implemented as a software application. The application implementing an embodiment, or one or more components thereof, can be configured as a native application in the form of a modification of an existing system for training and operating a neural network for object recognition, as a local application executing in a data processing system communicating with such an existing system over a short-range radio network such as Bluetooth, over a wired or wireline local area network (LAN), as a remote application over a wide area network (WAN), a standalone application, or some combination thereof.

While the embodiments are described using a neural network comprising a plurality of multi-node layers, an embodiment can be adapted for a single layer multi-node neural network as well. In practice, the neural network can comprise thousands if not millions of nodes spread across numerous layers, not necessarily in an evenly distributed manner, i.e. different layers can have different node densities.

The illustrative embodiments describe operations for mitigation enabling of a neural network using training inputs, and operations of a mitigation-enabled neural network to mitigate false recognitions in actual inputs. The mitigation enabling of a neural network does not change the weights of the nodes of the neural network, which have already been preset from the training of the neural network. The mitigation enabling operation of an embodiment learns, for a pre-trained neural network, those nodes that activate in response to—i.e., extract features from—altered inputs. The embodiment mitigation enables the neural network by then selectively suppressing those nodes in operation as described herein.

An embodiment performs mitigation enabling on a deep learning-trained neural network. The training data used by the embodiment in this training comprises inputs that are known to be valid, i.e., inputs that should cause those features to be extracted which lead to a correct object recognition by the neural network, and inputs that are known to be altered, i.e., inputs that should cause those other features to be extracted which lead to a false recognition by the neural network.

The embodiment subjects the neural network to a valid input and records the outputs of the various nodes at the various layers of the neural network. An output of a node is an activation of the node beyond a threshold level. At least some nodes in the neural network are activated—i.e., respond to and extract different features—differently in response to valid and altered inputs. For example, a valid input may cause node x in layer y to be activated due to feature z in a valid input whereas, an altered input may cause node p in layer q to be activated in response to extracting a feature of an altered input.

The embodiment constructs a matrix of the outputs, e.g., by recording the node outputs from a particular layer in a particular column (or row) of the matrix (i.e., a valid matrix).

The embodiment subjects the neural network to an altered input corresponding to the valid input. The embodiment records the outputs of the various nodes at the various layers of the neural network. Again, a matrix (i.e., an altered matrix) of outputs is formed. The embodiment compares the altered matrix resulting from the altered input with the valid matrix resulting from the valid input and identifies a set of nodes whose activations in the altered matrix are different from the corresponding activations in the valid matrix. The set of nodes thus identified are distributed across a set of layers, usually a set of intermediate layers in the neural network. For example, one intermediate layer may have a first subset of nodes from the set of nodes, a different intermediate layer may include a second subset of nodes from the set of nodes, and so on.

The embodiment may subject the neural network to more than one alterations of a valid input, i.e., a set of altered inputs corresponding to a valid input. Similarly, the mitigation enabling may use numerous valid inputs and corresponding numerous sets of altered inputs. Correspondingly, numerous valid matrices and numerous sets of altered matrices will result from the mitigation enabling.

An embodiment thus obtains numerous sets of nodes resulting from the numerous comparisons of output activation differences between valid and altered inputs. The embodiment compares the numerous sets of nodes to identify a final set of mitigation nodes, which includes those nodes whose activation appears to be different with altered inputs as compared to the activation from the corresponding valid input. The difference in the activation from an altered input can be more activation (higher output) or less activation (lower output) than the activation from a corresponding valid input. The embodiment arranges the mitigation nodes in the final set according to an order of activation differences, e.g., in a descending (or ascending) order of activation difference.

An embodiment further identifies a final set of mitigation layers in which the final set of mitigation nodes are present. Some mitigation layers may include more mitigation nodes than others. Accordingly, the embodiment also arranges the mitigation layers from the final set of layers in an order (e.g., ascending or descending) according to the number of mitigation nodes from the final set of mitigation nodes present therein.

The ordering of the mitigation nodes and mitigation layers enables an embodiment to determine the top N mitigation nodes, the top K mitigation layers, or both. N and K are referred to herein as hyperparameters of the neural network. One or both hyperparameters of the neural network can be specified to control a degree of accuracy that the neural network should achieve in object recognition, as will be described now. A degree of accuracy in object recognition is a ratio of a number of true or correct recognitions vs a number of false recognitions made by the neural network. For example, if in a sample of ten inputs—including a mix of valid and altered inputs—the neural network makes eight true recognitions and two false recognitions, the accuracy of the neural network is 8/2=forty percent.

In operation, one or both hyperparameters can be defaulted, computed, or specified. For example, one embodiment may set a default value for N and K for a neural network. another embodiment may compute the optimal values for N and K for a neural network from using past performances in a machine learning method. Another embodiment may receive the value for N and K for a neural network from a user or system.

During operation, given the value of N hyperparameter for a mitigation-enabled neural network, an embodiment selects the top N mitigation nodes from the final set of mitigation nodes of that neural network. Similarly, given the value of K hyperparameter for a mitigation-enabled neural network, an embodiment selects the top K mitigation layers in the mitigation-enabled neural network. The embodiment causes the outputs of the N mitigation nodes in the K mitigation layers to be suppressed in the object recognition operation of the mitigation-enabled neural network. An output of a node in a neural network can be suppressed by ignoring, discarding, disregarding, or otherwise causing the output of the node to not reach the output's intended destination within the neural network. In some cases, it may be possible to turn off a node—i.e., prevent the node from generating an output at all—as a way of suppressing the node. In some other cases, the operation of the node may remain unaffected, but the output is then prevented from reaching an intended destination, e.g., reaching another node in another layer of the neural network.

Thus, during operation, depending on the values of the hyperparameters, a number of mitigations nodes and mitigation layers being suppressed can be controlled, which in-turn controls false recognitions, which in-turn controls the degree of accuracy of the mitigation-enabled neural network. When greater than a threshold number of mitigation nodes are dropped or suppressed, the mitigation neural network might reduce false recognitions to below a threshold proportion, but may also over-squelch (cause misses) of true recognitions. Conversely, when smaller than a threshold number of mitigation nodes are dropped or suppressed, the mitigation neural network might not reduce false recognitions to below a threshold proportion, but may also not over-squelch (not miss) of true recognitions.

Depending upon the implementation of the neural network, the demand of the circumstances in which adversarial attacks by altered inputs are to be mitigated, a desired degree of accuracy (acceptable false recognitions, acceptable miss of true recognition, or both), or some combination thereof, the hyperparameters can be tuned to achieve a desired mitigation result from a mitigation-enabled neural network according to the illustrative embodiments. During operation, suppression of mitigation nodes in certain mitigation layers causes the nodes activated by altered inputs to be less influential in the final output of the mitigation-enabled deep-learning neural network, as compared to a deep-learning neural network that does not suppress mitigation nodes. The tunable (controllable) decrease in the influence of nodes determined to be activated by alteration features of altered inputs allows the deep-learning neural network to also become mitigation-enabled, which is able to better guard against adversarial attacks with altered inputs during operation than a neural network that is only deep-learning trained but not mitigation-enabled as described herein.

The manner of mitigating false recognition of altered inputs in convolutional neural networks described herein is unavailable in the presently available methods. A method of an embodiment described herein, when implemented to execute on a device or data processing system, comprises substantial advancement of the functionality of that device or data processing system in training and operating neural networks for object identification from a variety of types of inputs, where the inputs are susceptible to alterations in adversarial attacks.

The illustrative embodiments are described with respect to certain types of objects, inputs, alterations, thresholds, ratios, hyperparameters, nodes, layers, activations, neural network configurations, locations of embodiments, training, inputs, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments. Although certain operations of the various embodiments have been described with reference to a non-limiting example of visual recognition of objects from example image inputs, those of ordinary skill in the art will be able to use this disclosure to adapt an embodiment for other types of detections and/or segmentation type tasks and such adaptations are contemplated within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
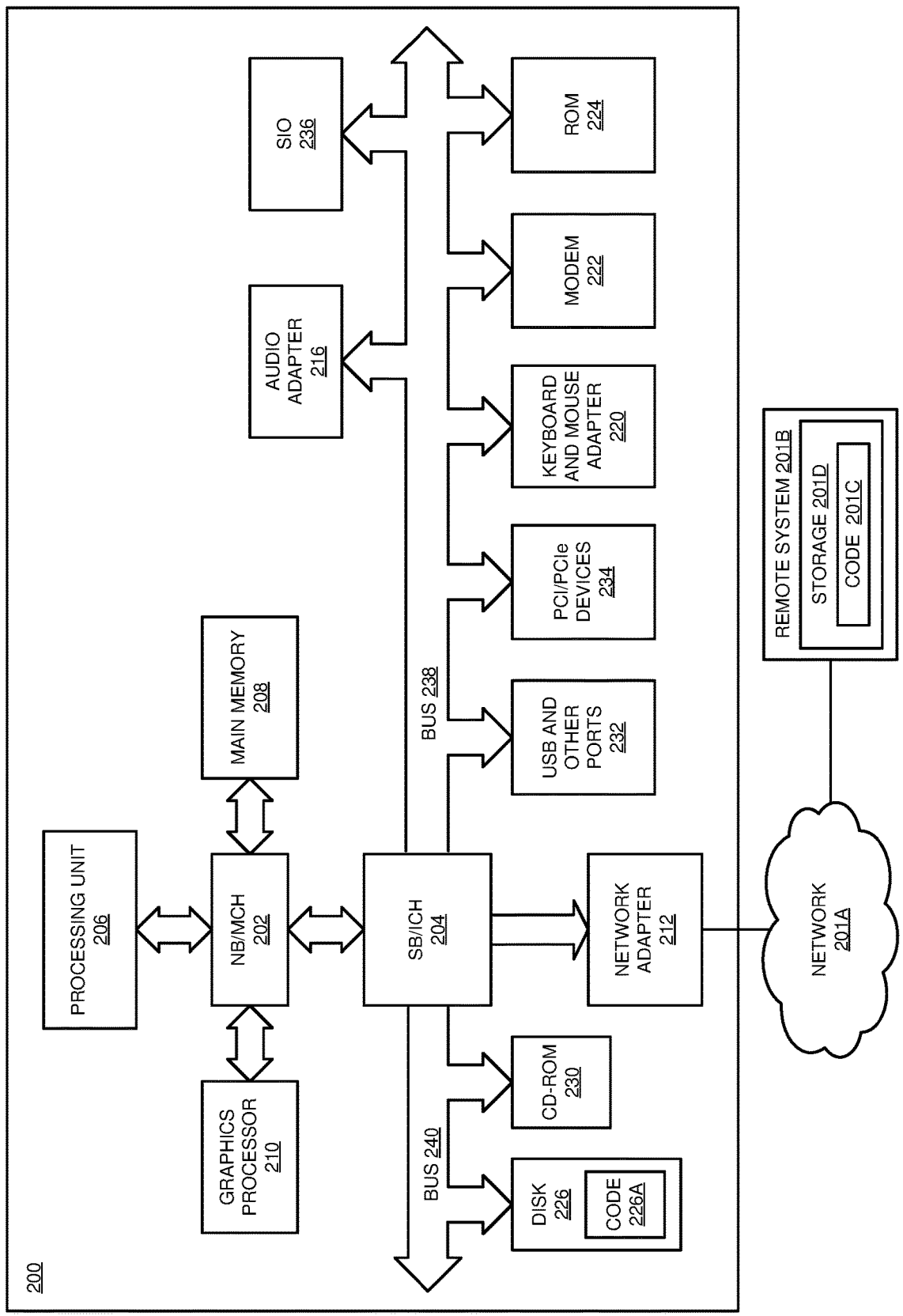
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 is usable for imparting mitigation enabling to neural network 107, operate neural network 107 as a mitigation-enabled neural network, or both. For example, application 105 uses training inputs 109 to impart the mitigation enabling to neural network 107, which results in the association of an ordered list of mitigation nodes, an ordered list of mitigation layers, or both, with neural network 107, the association transforming neural network 107—which is previously deep-learning trained—into also a mitigation-enabled neural network, in a manner described herein. During operation, application 105 receives input 134—e.g., an image input from an image capturing apparatus in device 132, a speech pattern from a speech capturing apparatus in device 132, a text pattern from a text editor in device 132. Application 105 may also receive one or more hyperparameters N and/or K, from a user or system, e.g., from client 114. Using the hyperparameters to selectively suppress mitigation nodes and/or layers, application 105 operates mitigation-enabled neural network 107 on the input from device 132 to tunably or adjustably mitigate adversarial attacks based on altered inputs, in a manner described herein. For example, if input 134 is a valid or altered input, application 105 causes mitigation-enabled neural network 107 to output a corresponding true recognition, i.e., recognize the object if input 134 is a valid input and not recognize the object if input 134 is an altered input.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
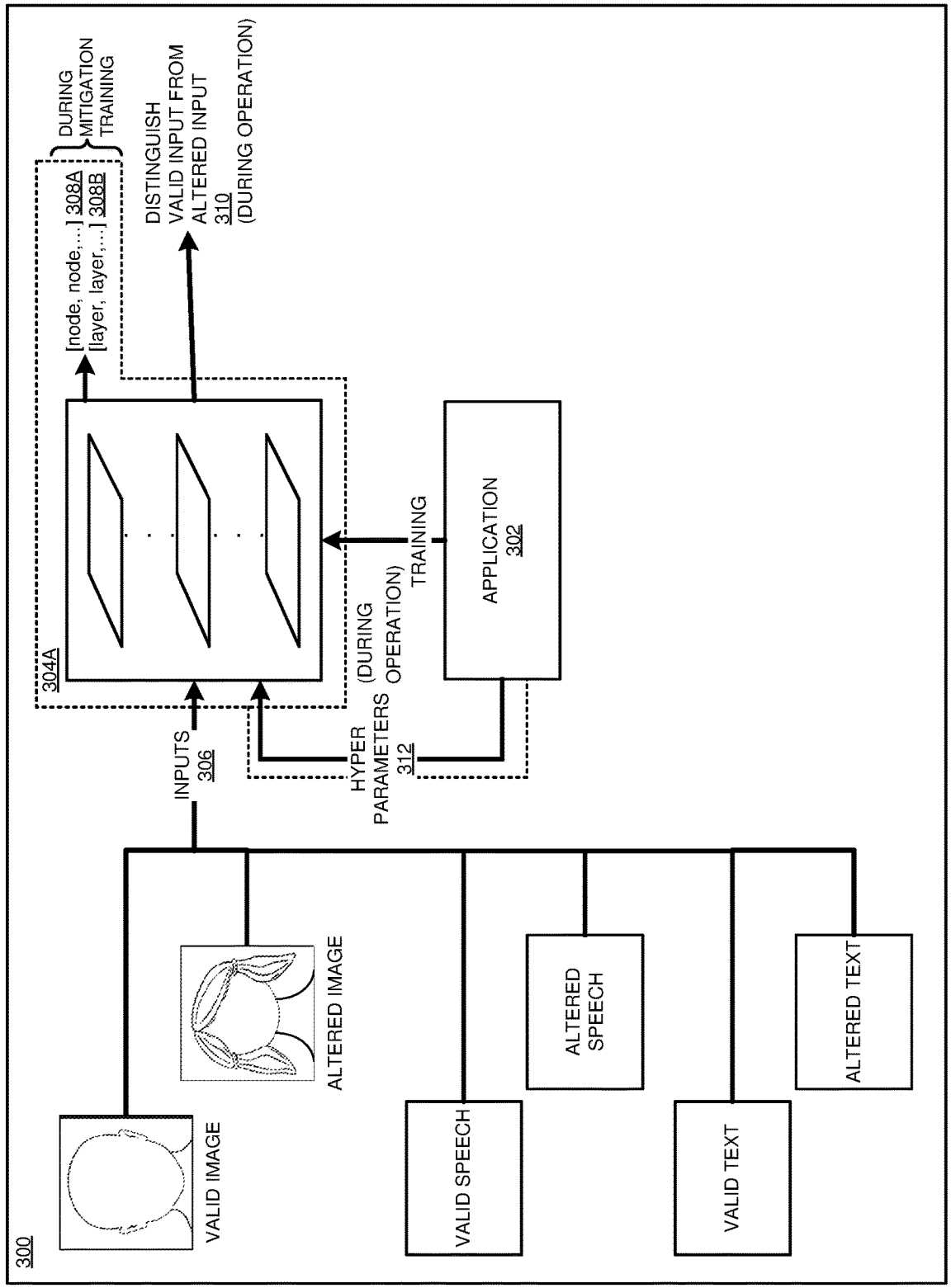
FIG. 3 depicts a block diagram of an example configuration for mitigating false recognition of altered inputs in convolutional neural networks in accordance with an illustrative embodiment.

With reference to FIG. 3, this figure depicts a block diagram of an example configuration for mitigating false recognition of altered inputs in convolutional neural networks in accordance with an illustrative embodiment. Application 302 is an example of application 105 in FIG. 1. neural network 304 is a non-limiting example of neural network 107 in FIG. 1, which is a multi-layer multi-node-per-layer deep-learning trained neural network, e.g., a CNN. Two states of neural network 304 are described herein—the first state as deep-learning trained neural network which undergoes mitigation enabling phase to become a mitigation-enabled neural network, and the second state as the mitigation-enabled neural network which operates in an operational phase to mitigate false recognitions.

In the training phase, inputs 306 include a mix of valid and altered inputs as described herein. Input 306 may include images, speech patterns, text patterns, or some combination of these and other types of inputs as contemplated herein.

Application 302 trains deep-learning-trained neural network 304 for mitigating false recognition of altered inputs in a manner described herein. Inputs 306 are training inputs 109 in the training phase. The result of the training phase is ordered arrays 308A and 308B. Ordered array 308A is a set of mitigation nodes, arranged in array 308A in an order of a degree of activation difference (difference between activation from valid inputs and activation from altered inputs) as described herein. Ordered array 308B is a set mitigation layers, each of which includes a subset of mitigation nodes. The mitigation layers are arranged in array 308B in an order of a number of mitigation nodes present in the mitigation layers.

Deep-learning neural network 304 and ordered arrays 308A and 308B together form deep-learning and mitigation-enabled neural network 304A. Application 302 operates deep-learning and mitigation-enabled neural network 304A for mitigating false recognition of altered inputs in a manner described herein. Inputs 306 are actual inputs 134 in the operational phase. Result 310 of the operational phase is an acceptable degree of accuracy in object recognition by distinguishing valid input from altered inputs as described herein.

Hyperparameters 312 are either computed by application 302 or received by application 302 as described herein. In the operational phase, application 302 applies hyperparameters 312 (N and K) to mitigation-enabled neural network 304A to suppress top N mitigation nodes according to ordered array 308A, from K top mitigation layers according to ordered array 308B.

Figure 4:
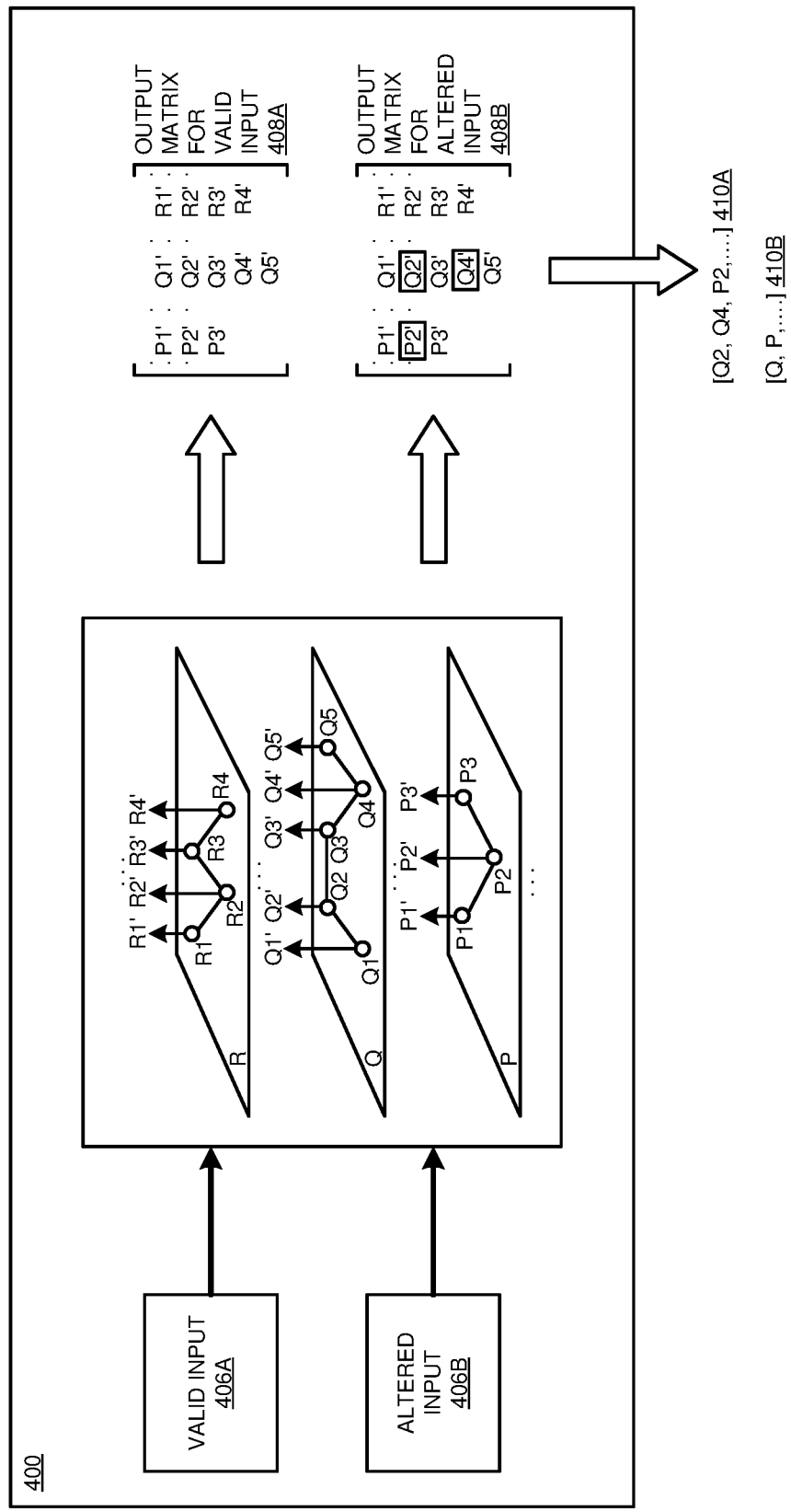
FIG. 4 depicts a block diagram of a training operation for creating a mitigation-enabled neural network in accordance with an illustrative embodiment.

With reference to FIG. 4, this figure depicts a block diagram of a training operation for creating a mitigation-enabled neural network in accordance with an illustrative embodiment. neural network 404 is an example of neural network 304 in FIG. 3. Valid input 406A is an example of inputs 306 and is a training input that is valid for true object recognition. Altered input 406B is another example of inputs 306 and is a training input that is altered to cause a false object recognition.

Assume, as a simplified non-limiting example, that neural network 404 comprises intermediate layers P, Q, and R. Layer P includes several nodes including nodes P1 producing output P1', P2 producing output P2', and P3 producing output P3'. Layer Q includes several nodes including nodes Q1 producing output Q1', Q2 producing output Q2', Q3 producing output Q3', Q4 producing output Q4', and Q5 producing output Q5'. Layer R includes several nodes including nodes R1 producing output R1', R2 producing output R2', R3 producing output R3', and R4 producing output R4'.

For valid input 406A, matrix 408A includes the outputs of the various nodes at various layers as shown. For altered input 406B, matrix 408B includes the outputs of the various nodes at various layers as shown. Application 302 of FIG. 3 determines from matrices 408A and 408B that from valid input 406A and altered input 406B, the activation differences of nodes P2, Q2, and Q4 exceed the activation differences of the other nodes in layers P, Q, and R. Based on the amounts of their respective activation differences, e.g., difference between P2' in 408B and P2' in 408A, and so on, the application constructs ordered arrays 410a and 410B. Ordered arrays 410A and 410B are examples of ordered arrays 308A and 308B, respectively. In a non-limiting example, it might be the case that the difference is largest (positive or negative difference) for node Q2, followed by nodes Q4 and P2, and so on, in a descending order. Nodes Q2, Q4, and P2 form mitigation nodes. Accordingly, layer Q has the most number of mitigation nodes, followed by layer P, and so on. Layers Q and P form mitigation layers.

In a hypothetical example, if hyperparameters (N, K) were specified as (1, 1), the application would suppress node Q2 from layer Q. For hyperparameters (N, K)=(2, 1), nodes Q2, Q4 in layer Q would be suppressed. For hyperparameters (N, K)=(3, 2), nodes Q2, Q4, P2 in layers Q and P would be suppressed. If only hyperparameter N is specified, e.g., N=3, only the top 3 mitigation nodes spread across any mitigation layers, i.e., nodes Q2, Q4, and P2, are suppressed. If only hyperparameter K is specified, e.g., K=2, all mitigation nodes in the top 2 mitigation layers, i.e., layers Q and P, are suppressed. In practice, with a neural network comprising hundreds of layers with millions of nodes, hyperparameters (N, K) can be used in this manner to fine-tune a desired level of node suppression for achieving a desired degree of accuracy.

Figure 5:
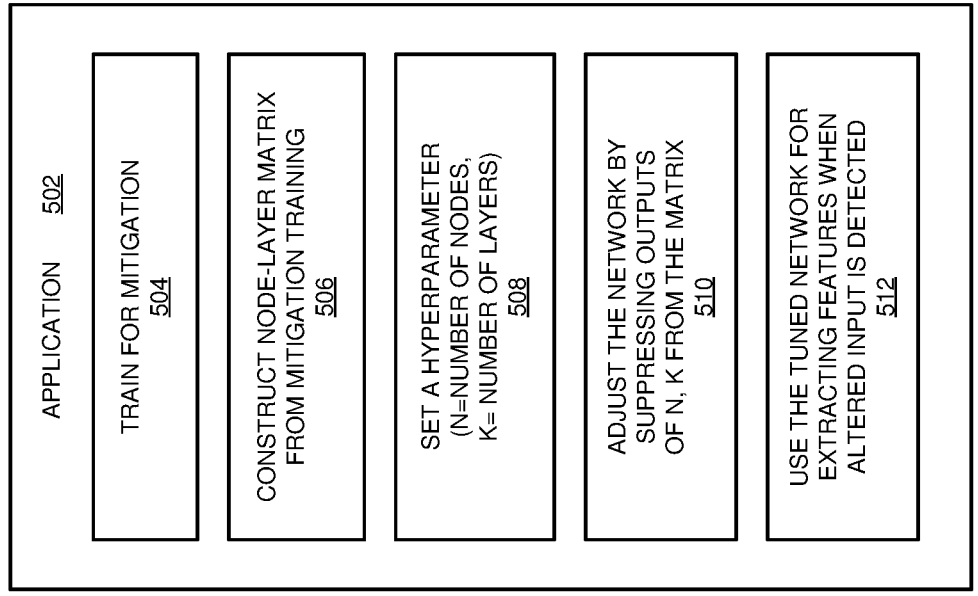
FIG. 5 depicts a block diagram of an application for mitigating false recognition of altered inputs in convolutional neural networks in accordance with an illustrative embodiment.

With reference to FIG. 5, this figure depicts a block diagram of an application for mitigating false recognition of altered inputs in convolutional neural networks in accordance with an illustrative embodiment. Application 502 is an example of application 302 in FIG. 3. Application 502 is described to include features and operations that are usable during the training phase as well as features and operations that are the operational phase. This example implementation of application 502 is not intended to be limiting. From this disclosure, those of ordinary skill in the art will be able to separately implement the training phase-only functions and operational phase-only functions in separate applications, and such separation is contemplated within the scope of the illustrative embodiments.

Component 504 is usable in the training phase and imparts mitigation enablement to a deep-learning neural network using training inputs. Component 506 operates in conjunction with component 504 during the training phase and constructs node-layer matrices of node outputs from valid and altered inputs.

Component 508 is usable in operational phase and computes, receives, learns, or otherwise obtains hyperparameter values N and/or K. Component 508 sets the hyperparameter values for a given operation of the mitigation-enabled neural network.

Component 510 adjusts the configuration of the mitigation-enabled neural network according to the hyperparameters set by component 508. Specifically, component suppresses a number of mitigation nodes in a number of mitigation layers according to the values of the hyperparameters. The selective suppression performed by component 510 produces a tuned neural network that is deep-learning and mitigation-enabled. Component 512 operates the tuned neural network on actual inputs during the operational phase to extract features from the input. If the suppressed nodes are activated from features extracted from an altered input, the suppression will significantly mitigate a false recognition from that altered input. If the actual input is a valid input, the suppressed nodes will not significantly affect the feature extraction and activation from the input and will leave the true recognition capabilities of the neural network substantially undisturbed.

Figure 6:
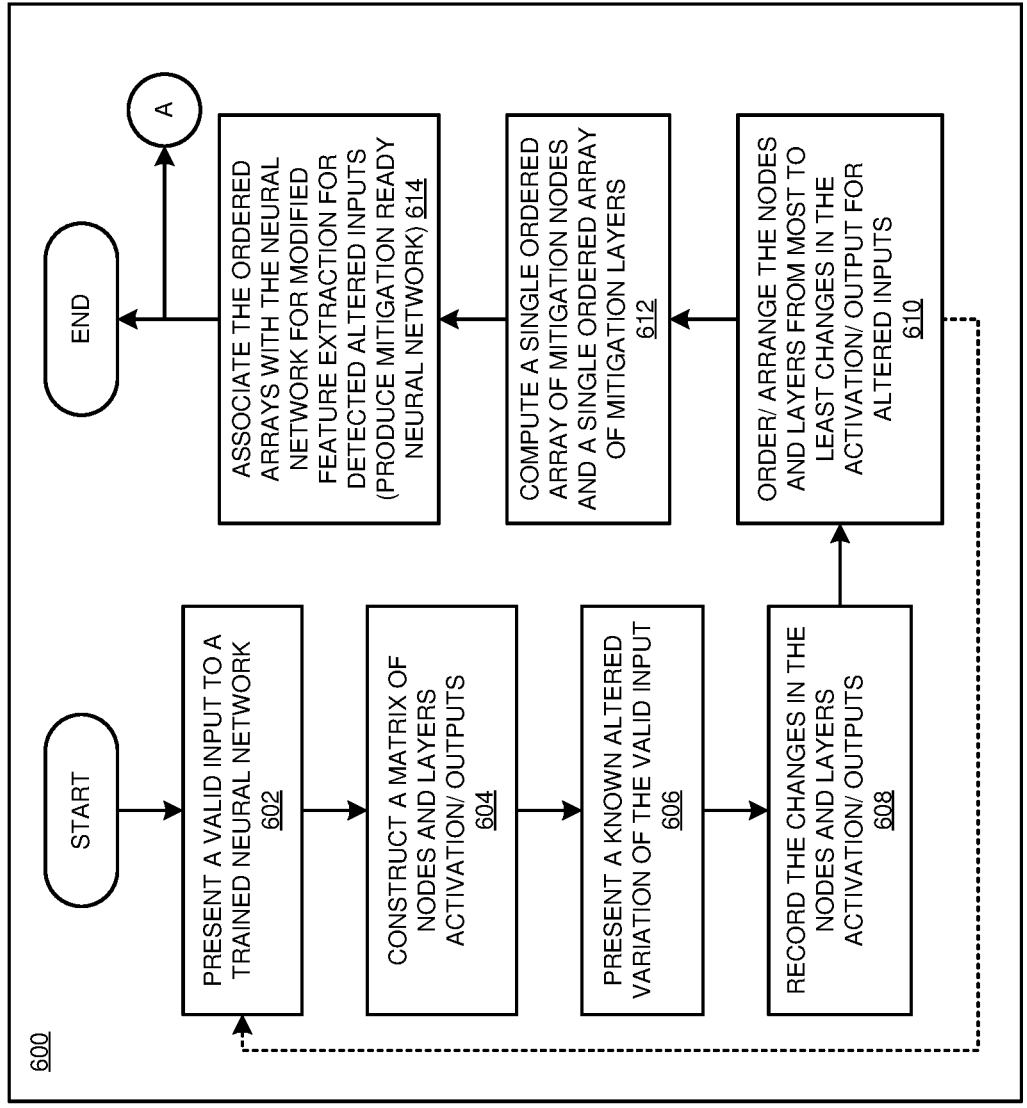
FIG. 6 depicts a flowchart of an example process for training a neural network for mitigating false recognitions from altered inputs in accordance with an illustrative embodiment.

With reference to FIG. 6, this figure depicts a flowchart of an example process for training a neural network for mitigating false recognitions from altered inputs in accordance with an illustrative embodiment. Process 600 can be implemented in application 502 of FIG. 5.

The application presents a valid input to a deep-learning-trained neural network (block 602). The application constructs a matrix of nodes and layers that are activated from the input and populates the matrix with the output values of the nodes (block 604).

The application presents a known altered variant of the valid input to the deep-learning-trained neural network (block 606). The application populates the matrix with the output values of the nodes (block 608). The values in block 608 may be overwritten in the matrix from block 604 or a different copy of the matrix may be populated at block 608.

The application creates an ordered array of nodes and an ordered array of layers (block 610). The ordered array of nodes orders a node in the matrix of block 608 in an order of a difference in the node activation relative to the corresponding node in the matrix of block 604.

The application repeats block 602-610 for one or more valid input and one or more altered inputs. The resulting arrays from various iterations of executing blocks 602-610 can be consolidated into a single array of mitigation nodes and a single array of mitigation layers using any suitable method, including but not limited to a statistical method of combining ordered arrays. Essentially, one representative ordered array of mitigation nodes and one representative ordered array of mitigation layers is produced as a result of training the neural network with several valid and altered inputs (block 612).

The application associates the representative ordered array of mitigation nodes and representative ordered array of mitigation layers with the neural network to form a mitigation-enabled neural network (block 614). The mitigation-enabled neural network of block 614 can then be tuned to achieve a desired degree of accuracy using one or both hyperparameters in adjustably suppressing activations from the features that are extracted from altered inputs. The application either ends process 600 or exits process 600 at exit point "A" to enter process 700 at a corresponding entry point "A" therein.

Figure 7:
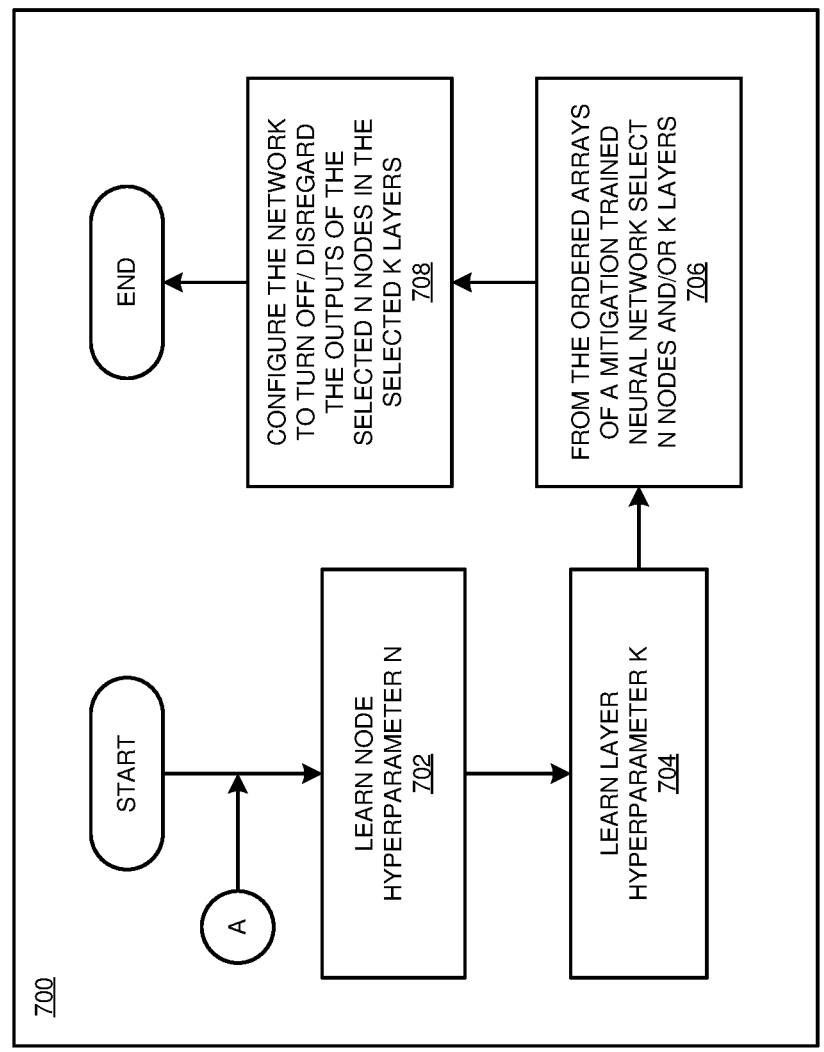
FIG. 7 depicts a flowchart of an example process for mitigating false recognitions of objects from altered inputs in accordance with an illustrative embodiment.

With reference to FIG. 7, this figure depicts a flowchart of an example process for mitigating false recognitions of objects from altered inputs in accordance with an illustrative embodiment. Process 700 can be implemented using application 502 in FIG. 5.

The application learns, computes, or otherwise obtains hyperparameter N for suppressing a number of mitigation nodes (block 702). The application learns, computes, or otherwise obtains hyperparameter K for the mitigation layers from which to suppress a number of mitigation nodes (block 704).

From the ordered arrays associated with a mitigation-enabled neural network, the application selects the top N mitigation nodes, top K mitigation layers, or both (block 706). The application configures the neural network such that the selected mitigation nodes and/or mitigation layers are suppressed (block 708). The application thus configures the neural network for mitigating false recognitions of objects when subjected to a mix of valid and altered inputs during operational phase. The application ends process 700 thereafter.

Thus, a computer implemented method, system or apparatus, and computer program product are provided in the illustrative embodiments for mitigating false recognition of altered inputs in convolutional neural networks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
inputting, to a neural network that is pre-configured to recognize objects from inputs when operating using a processor and a memory, a valid training input for object recognition;
inputting, to the neural network, an altered training input for object recognition;
determining an activation difference from the valid training input to the altered training input for each of a plurality of nodes of the neural network;
generating an ordered list of the plurality of nodes according to respective activation differences, wherein a first activation difference of a first node in the activation differences of the plurality of nodes comprises a difference between a first output produced from the node corresponding to the valid training input and a second output produced from the node corresponding to the altered training input, and wherein the ordered list arranges the plurality of nodes in one of an ascending and a descending order of activation differences corresponding to each of the plurality of nodes; and
causing suppressing of outputs of a number of nodes on the ordered list during an operational phase of the neural network, wherein the number of nodes is based on a mitigation-node hyperparameter value.

2. The method of claim 1, further comprising:
sending an actual input to the neural network during the operational phase for the object recognition, wherein the actual input is a valid input; and
causing the neural network to generate, responsive to the actual input, an object recognition output while suppressing the outputs of the number of nodes on the ordered list.

3. The method of claim 1, further comprising:
recording a valid output of each of the plurality of nodes of the neural network corresponding to the valid training input;
recording an altered output of each of the plurality of nodes of the neural network corresponding to the altered training input; and
associating an array with the neural network, the array comprising the ordered list of the nodes;
wherein the activation differences are respective differences between the altered output and the valid output for each of the plurality of nodes.

4. The method of claim 1, further comprising:
selecting a layer of the neural network as a mitigation layer,
wherein the mitigation layer includes at least one of the number of nodes, and
wherein the mitigation layer is one of one or more mitigation layers selected based on a value of a mitigation-layer hyperparameter.

5. The method of claim 4, further comprising:
associating an array with the neural network, the array comprising the one or more mitigation layers; and
positioning the mitigation layer in the array in an order relative to other mitigation layers in the array, the order using an amount of the number of nodes that are on the mitigation layer in determining a position of the mitigation layer in the array.

6. The method of claim 1, wherein the altered input comprises an image representing an altered facial feature of a human.

7. The method of claim 1, wherein the altered input comprises an image representing an altered identifying characteristic of a human.

8. The method of claim 1, wherein data of the altered training input has been modified by adding a feature to the data.

9. The method of claim 1, wherein data of the altered training input has been modified by deleting a feature from the data.

10. A computer usable program product comprising a computer-readable storage medium, and computer usable code stored on the storage medium, the stored computer usable code comprising:
program instructions to input, to a neural network that is pre-configured to recognize objects from inputs when operating using a processor and a memory, a valid training input for object recognition;
program instructions to input, to the neural network, an altered training input for object recognition;
program instructions to determine an activation difference from the valid training input to the altered training input for each of a plurality of nodes of the neural network;
program instructions to generate an ordered list of the plurality of nodes according to respective activation differences, wherein a first activation difference of a first node in the activation differences of the plurality of nodes comprises a difference between a first output produced from the node corresponding to the valid training input and a second output produced from the node corresponding to the altered training input, and wherein the ordered list arranges the plurality of nodes in one of an ascending and a descending order of activation differences corresponding to each of the plurality of nodes; and
program instructions to cause suppressing of outputs of a number of nodes on the ordered list during an operational phase of the neural network, wherein the number of nodes is based on a mitigation-node hyperparameter value.

11. The computer usable program product of claim 10, further comprising:
program instructions to send an actual input to the neural network during the operational phase for the object recognition, wherein the actual input is a valid input; and
program instructions to cause the neural network to generate, responsive to the actual input, an object recognition output while suppressing the outputs of the number of nodes on the ordered list.

12. The computer usable program product of claim 10, further comprising:
program instructions to record a valid output of each of the plurality of nodes of the neural network corresponding to the valid training input;
program instructions to record an altered output of each of the plurality of nodes of the neural network corresponding to the altered training input; and
program instructions to associate an array with the neural network, the array comprising the ordered list of the nodes;
wherein the activation differences are respective differences between the altered output and the valid output for each of the plurality of nodes.

13. The computer usable program product of claim 10, further comprising:
   program instructions to select a layer of the neural network as a mitigation layer,
   wherein the mitigation layer includes at least one of the number of nodes, and
   wherein the mitigation layer is one of or more mitigation layers selected based on a value of a mitigation-layer hyperparameter.

14. The computer usable program product of claim 13, further comprising:
   program instructions to associate an array with the neural network, the array comprising the one or more mitigation layers; and
   program instructions to position the mitigation layer in the array in an order relative to other mitigation layers in the array, the order using an amount of the number of nodes that are on the mitigation layer in determining a position of the mitigation layer in the array.

15. The computer usable program product of claim 10, wherein the altered input comprises an image representing an altered facial feature of a human.

16. The computer usable program product of claim 10, wherein the computer usable code is stored in a computer readable storage device in a data processing system, and wherein the computer usable code is transferred over a network from a remote data processing system.

17. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

18. A computer system comprising a processor, a computer-readable memory, and a computer-readable storage device, and computer usable code stored on the storage device for execution by the processor via the memory, the stored computer usable code comprising:
   program instructions to input, to a neural network that is pre-configured to recognize objects from inputs when operating using a processor and a memory, a valid training input for object recognition;
   program instructions to input, to the neural network, an altered training input for object recognition;
   program instructions to determine an activation difference from the valid training input to the altered training input for each of a plurality of nodes of the neural network;
   program instructions to generate an ordered list of the plurality of nodes according to respective activation differences, wherein a first activation difference of a first node in the activation differences of the plurality of nodes comprises a difference between a first output produced from the node corresponding to the valid training input and a second output produced from the node corresponding to the altered training input, and wherein the ordered list arranges the plurality of nodes in one of an ascending and a descending order of activation differences corresponding to each of the plurality of nodes; and
   program instructions to cause suppressing of outputs of a number of nodes on the ordered list during an operational phase of the neural network, wherein the number of nodes is based on a mitigation-node hyperparameter value.

* * * * *